United States Patent
Conte Da Silva et al.

(10) Patent No.: US 11,805,731 B2
(45) Date of Patent: Nov. 7, 2023

(54) AUGER COVER

(71) Applicant: AGCO International GmbH, Neuhausen (CH)

(72) Inventors: Leandro Conte Da Silva, Breganze (IT); Paolo Dal Lago, Breganze (IT); Gianfranco Dal Santo, Breganze (IT)

(73) Assignee: AGCO International GmbH, Neuhausen (CH)

( * ) Notice: Subject to any disclaimer, the term of this patent is extended or adjusted under 35 U.S.C. 154(b) by 462 days.

(21) Appl. No.: 16/967,096

(22) PCT Filed: Apr. 1, 2019

(86) PCT No.: PCT/EP2019/058172
§ 371 (c)(1),
(2) Date: Aug. 3, 2020

(87) PCT Pub. No.: WO2019/206576
PCT Pub. Date: Oct. 31, 2019

(65) Prior Publication Data
US 2021/0037708 A1    Feb. 11, 2021

(30) Foreign Application Priority Data
Apr. 26, 2018    (GB) ..................................... 1806796

(51) Int. Cl.
*A01D 41/12*    (2006.01)
*A01F 12/46*    (2006.01)
(Continued)

(52) U.S. Cl.
CPC .......... *A01D 41/1217* (2013.01); *A01F 12/46* (2013.01); *A01D 41/1226* (2013.01);
(Continued)

(58) Field of Classification Search
CPC ............ A01D 41/1217; A01D 41/1208; A01D 41/1226; A01D 61/008; A01F 12/46;
(Continued)

(56) References Cited

U.S. PATENT DOCUMENTS

| 1,811,064 A | * | 6/1931 | Raney | A01F 12/46 198/661 |
| 2,701,666 A | * | 2/1955 | Hicks | B65D 90/623 222/548 |

(Continued)

FOREIGN PATENT DOCUMENTS

| CN | 104219947 A | * | 12/2014 | ......... A01D 41/1217 |
| CN | 108021106 A | * | 5/2018 | ........... A01B 69/001 |

(Continued)

OTHER PUBLICATIONS

UK Intellectual Property Office, Search Report for Priority Application No. GB1806796.7, dated Oct. 25, 2018.
(Continued)

*Primary Examiner* — Arpad F Kovacs

(57) ABSTRACT

An auger cover for an auger conveyor for a grain bin of a combine harvester includes a cover plate that is hingedly attached to the auger conveyor. The hinge attaching the cover plate to the auger conveyor has a hinge plate that includes a flexible material.

20 Claims, 5 Drawing Sheets

(51) Int. Cl.
    *B65G 33/08*         (2006.01)
    *B65G 47/78*         (2006.01)
    *F16J 15/02*         (2006.01)
    *B65G 33/14*         (2006.01)
    *A01D 61/00*         (2006.01)
    *B65G 33/22*         (2006.01)
    *B65G 33/24*         (2006.01)
    *B65D 90/62*         (2006.01)

(52) U.S. Cl.
    CPC .......... *A01D 61/008* (2013.01); *B65D 90/623* (2013.01); *B65G 33/08* (2013.01); *B65G 33/14* (2013.01); *B65G 33/22* (2013.01); *B65G 33/24* (2013.01); *B65G 47/78* (2013.01); *F16J 15/02* (2013.01)

(58) Field of Classification Search
    CPC ...... B65D 90/623; B65D 33/08; B65D 33/14; B65D 33/22; B65D 33/24; B65D 47/78; F16J 15/02
    See application file for complete search history.

(56) References Cited

U.S. PATENT DOCUMENTS

| | | | | |
|---|---|---|---|---|
| 2,776,078 | A * | 1/1957 | Raynor | B65D 90/582 222/413 |
| 3,040,939 | A * | 6/1962 | McCollough | B65D 90/623 222/413 |
| 3,045,804 | A * | 7/1962 | Peterson | A01D 41/1208 198/550.1 |
| 3,070,221 | A * | 12/1962 | Bobrowski | B65G 33/14 198/671 |
| 3,568,863 | A * | 3/1971 | Rohwedder | A01F 12/46 198/860.5 |
| 3,841,536 | A * | 10/1974 | Maiste | A01D 41/1208 222/506 |
| 4,029,228 | A | 6/1977 | Shaver | |
| 4,540,086 | A * | 9/1985 | David | B65G 47/78 198/671 |
| 5,269,724 | A * | 12/1993 | Becker | A01D 41/1277 73/863.52 |
| 6,358,143 | B1 * | 3/2002 | Hurlburt | A01D 41/1208 414/502 |
| 6,367,234 | B1 * | 4/2002 | Hurlburt | A01D 41/1217 56/16.6 |
| 7,584,836 | B2 * | 9/2009 | McCully | A01D 41/1217 198/531 |
| 8,265,837 | B2 * | 9/2012 | Ricketts | A01D 41/1217 701/50 |
| 9,468,145 | B2 * | 10/2016 | Coppinger | F16J 15/02 |
| 2003/0079956 | A1 * | 5/2003 | Reimer | A01D 41/1217 193/1 |
| 2004/0259612 | A1 * | 12/2004 | Ramon | A01D 41/1226 460/119 |
| 2008/0149463 | A1 | 6/2008 | McCully et al. | |
| 2008/0305843 | A1 | 12/2008 | Grotelueschen et al. | |
| 2009/0215509 | A1 | 8/2009 | Johnson et al. | |
| 2010/0071333 | A1 | 3/2010 | Temple et al. | |
| 2014/0113694 | A1 | 4/2014 | Coppinger et al. | |
| 2014/0128134 | A1 * | 5/2014 | Linde | B65G 33/08 460/114 |
| 2014/0329572 | A1 * | 11/2014 | McCully | A01F 12/46 460/114 |
| 2016/0057927 | A1 * | 3/2016 | Bojsen | A01D 41/1217 414/526 |
| 2016/0113203 | A1 * | 4/2016 | Missotten | A01F 12/46 460/149 |
| 2016/0316632 | A1 * | 11/2016 | Vandevelde | A01F 12/444 |
| 2017/0265389 | A1 | 9/2017 | Rodrigues et al. | |

FOREIGN PATENT DOCUMENTS

| | | | | |
|---|---|---|---|---|
| CN | 114246053 A | * | 3/2022 | ......... A01D 41/1208 |
| EP | 0 274 761 A1 | | 7/1988 | |
| EP | 0440978 A1 | | 8/1991 | |
| EP | 2497354 A1 | * | 9/2012 | ......... A01D 41/1217 |

OTHER PUBLICATIONS

European Patent Office, International Search Report for related International Application No. PCT/EP2019/058172, dated Jul. 16, 2019.

* cited by examiner

AUGER COVER

FIELD

The present invention relates to a cover for an auger. In particular, the invention relates to a cover for an auger for use with a grain bin loading auger. Such a grain bin loading auger may typically be found in an agricultural machine, such as a combine harvester.

BACKGROUND

Combine harvesters produce (i.e., harvest) grains from crops by a number of processes. Such combines commonly comprise grain bins on their upper surface, which grain bins are filled by auger conveyors (typically referred to simply as 'augers') that bring the grain from within the machine up to and into the grain bin. Subsequently, these bins are typically emptied by further augers, the contents being moved to further storage bins, trailers pulled by tractors, or the like.

FIG. 1 shows a typical general arrangement. Grain bin 3 is for the storage of grain produced by the combine harvester 1. Grain bin 3 is filled by auger conveyor 5, which brings grain up from the internal processing elements (thresher, cleaning shoe, etc.) of the combine 1. For the purposes of this disclosure only the top part of the auger conveyor 5 is shown; various specific arrangements within the combine 1 will be familiar to those skilled in the art, the details of which are not relevant to this disclosure. The auger conveyor 5 comprises an auger tube 5a and an auger screw 5b. The top end 5t of the auger conveyor 5 is situated at a point within the grain bin 3 that is raised from the floor 3f of the grain bin 3, and below the top 3t of the grain bin 3. The top end 5t is raised from the floor 3f in order that the weight of grain, as the bin fills, does not provide too much resistance to the auger screw 5b. Similarly, the auger conveyor 5 must not sit so high that it interferes with a roof of the grain bin 3 or, as shown in FIG. 1, grain bin extensions 3e, which also act as roofs and which can move from an open (up) position to a closed (down) position as indicated by dotted lines 3c. The top end 5bt of the auger screw 5b sits somewhat proud of the top end of the auger tube Sat. This is also to prevent the weight of grain from providing too great a resistance to the turning of the auger screw 5b. A bracket 5k holds a bearing (not shown) for supporting the top end 5bt of the auger screw 5b.

Typically these grain bin auger conveyors 5 are required to move a large amount of grain at relatively high speed due to the high capacity of modern combines. As such, particularly when the top end 5t of the auger 5 is uncovered by grain, the grain can be flung outwards upwards and sideways from the auger screw 5b, as indicated by arrows 7, and may be flung out of the grain bin 3 altogether, causing losses.

Existing solutions to this problem are illustrated in FIGS. 2A and 2B.

FIG. 2A illustrates a fixed sheet metal auger cover 9 affixed to the top of the auger conveyor 5 by supports 9s. The purpose of this cover 9 is simply to stop the grains ejecting from the top of the auger 5 in certain directions. The issue then is that the gap 9g between the auger cover 9 and the top end 5t of the auger tube 5a has to be relatively small in order to control the ejection of the grains, but that if this gap is too small then the small passage area provided will cause back-pressure on the auger screw 5b, resulting in an excessive increased torque demand. The bracket 5k (FIG. 1) for supporting a bearing for supporting the top end of the auger screw 5b is omitted from FIG. 2A, to aid in clarity.

FIG. 2B illustrates an alternative in which a pivoted cover 11 is affixed to the top of the auger 5 by supports 11s. The cover has brackets 11b hingedly attached at point 11h to the supports 11s. Accordingly, as the grain is ejected from the top of the auger 5, the directions in which the grain is thrown are constrained by the plate 11. As the grain bin 3 starts to fill, the rising grain level causes the plate 11 to rise in the direction of arrow 13. As the grain bin 3 is emptied again, the plate 11 is allowed to return to its lower position.

An issue with the alternative shown in FIG. 2B is that grains may get caught within the hinging mechanism, thus stopping the cover 11 from returning. Additionally, depending on the inclination of the overall system (i.e., the combine 1) gravity alone may be unable to return the plate to its initial position while the system is operating. Again, the bracket 5k (FIG. 1) for supporting a bearing for the top end of the auger screw 5b is omitted from FIG. 2B for clarity, although it will be recognized that a bracket 5k may serve the dual function of supporting a bearing for supporting the top end of the auger screw 5b and for supporting the pivoted cover 11 in the manner of bracket 11s.

A solution to these problems would be desirable.

BRIEF SUMMARY

In some embodiments, an auger cover for an auger conveyor for a grain bin of a combine harvester includes a cover plate hingedly attached to the auger conveyor by a hinge comprising a hinge plate of flexible material.

An advantage of this embodiment is that the hinge is not subject to being blocked by grains, because a simple hinge plate of flexible material does not have any gaps in it that can be blocked, unlike the hinge 11h shown in FIG. 2B.

In an embodiment, the hinge plate comprises a flexible material that is also resilient, meaning that the hinge plate resists deformation and also will return to its original shape once a deforming force is released from it. The advantage of this embodiment is that the cover plate of the auger cover is resiliently urged towards a starting position.

In an embodiment, the hinge plate is made of canvas, such as a cotton canvas material or a canvas-based material. The hinge plate may be a cotton canvas material with a rubber coating or a vulcanized rubber coating. A suitably thick canvas-based material is both flexible and resilient. As the skilled person would appreciate, the thickness of the canvas and/or the precise make-up of the material can be selected in order to provide a selected degree of both flexibility and resilience based on the requirements of the auger in question, such as the size of auger, the size of cover plate, the weight of cover plate, and the speed and power with which grains are pushed into the cover plate by the auger screw. The amount of resilience demonstrated by the hinges may be selected to prevent the cover plate from merely being blown completely out of the way by grains issuing from the auger, particularly when the bin is largely empty, but not being so stiff that the cover plate is not moved aside by the mass of grain that builds up in the bin and eventually fills up to a point that the end of the auger is covered, and the cover plate is no longer required to stop grains being thrown from the bin.

It has been found that a thick canvas material with a vulcanized rubber coating is a suitable material for this application. The range of thickness found to be suitable to fulfil the operational requirements is typically in the range from 4 mm to 10 mm, preferably 6 mm to 8 mm, and in a specific embodiment later described herein, the thickness of material used is 7 mm. It will be appreciated by the skilled person that other materials may be found suitable and used.

BRIEF DESCRIPTION OF THE DRAWINGS

The disclosure will now be described in more detail by reference to the drawings, in which.

DETAILED DESCRIPTION

Figure 3:
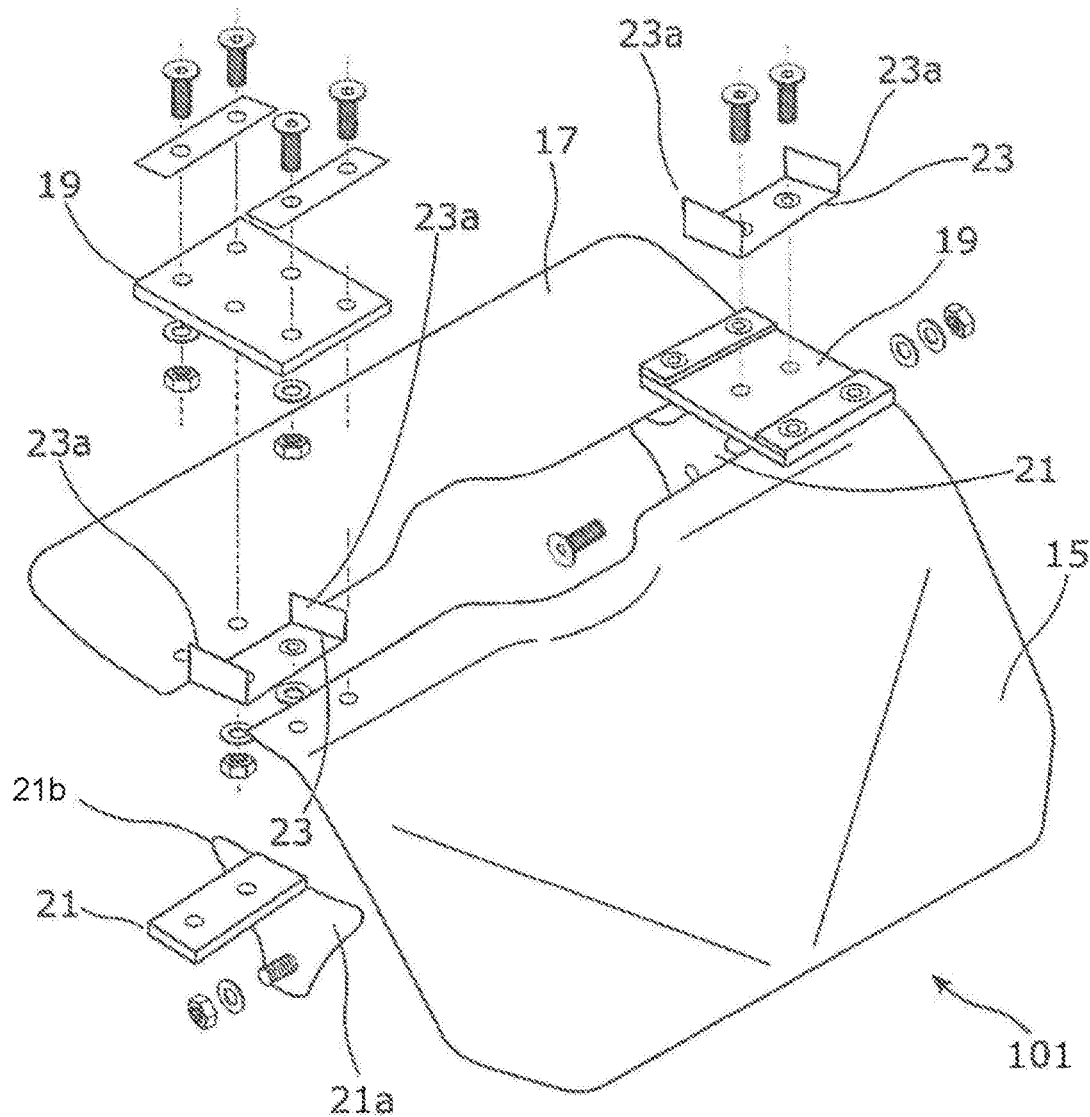
FIG. 3 is a partially exploded view of an auger cover assembly.
Figure 4:
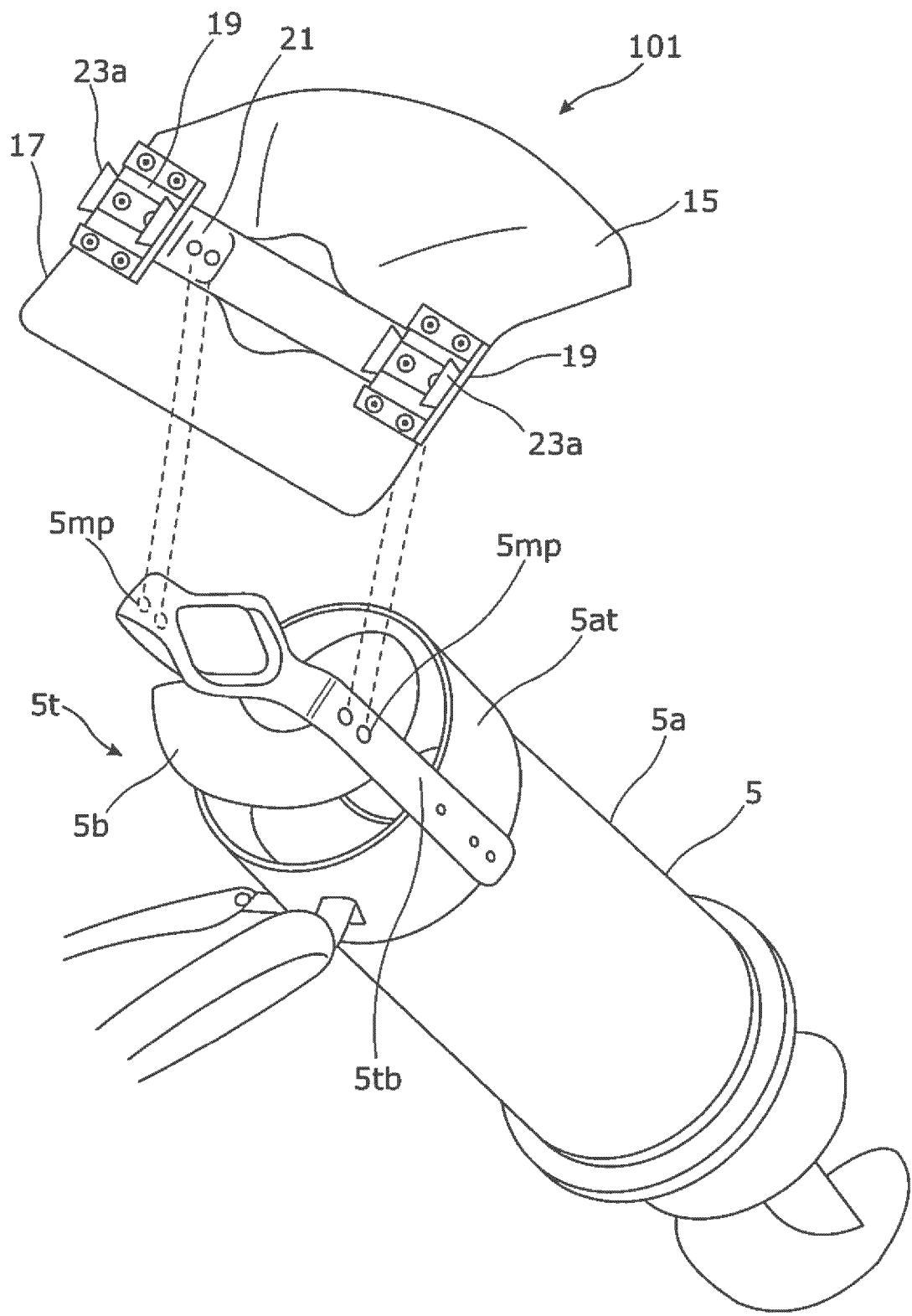
FIG. 4 shows the auger cover assembly of FIG. 3 assembled and in relation to an auger conveyor.

FIG. 3 shows a partially exploded view of an auger cover assembly 101. Two cover plates 15 and 17 are joined to a pair of canvas hinges 19. The canvas hinges comprise a canvas 'plate' of cotton canvas material with a vulcanised rubber coating and an overall thickness of 7 mm. In turn, the canvas hinge plates are bolted to a pair of support brackets 21 by which the auger cover is ultimately attached to an auger 5 (via an auger bracket 5tb) as shown in FIG. 4. Each bracket 21 has protrusions 21a and 21b that act as 'hardstops' to prevent the cover plates 15 and 17 from moving 'downwards' beyond a certain point ('lower hardstops'). Further, to the upper side of each of the canvas hinge plates 19 are attached a pair of upper hardstop brackets 23, each having upward protrusions 23a that prevent the cover plates from moving upwards beyond a certain point.

FIG. 4 shows the auger cover assembly 101 of FIG. 3 assembled, in relation to an auger assembly 5 comprising an auger screw 5b, an auger tube 5a, and an auger top bracket 5tb attached to the top end 5at of the auger tube 5a. The auger top bracket 5tb also acts as a mounting point for a support bearing for the top end 5t of the auger screw 5b. The auger cover assembly 101 is designed to be affixed to the auger top bracket 5tb by the brackets 21, at the mounting points 5mp. Standard nut-and-bolt assemblies, with suitable washers, are used for connecting all the pieces together, in accordance with standard practice in which the skilled person will be well familiar—as well as the possibility of normal standard alternatives, such as rivets.

Figure 1:
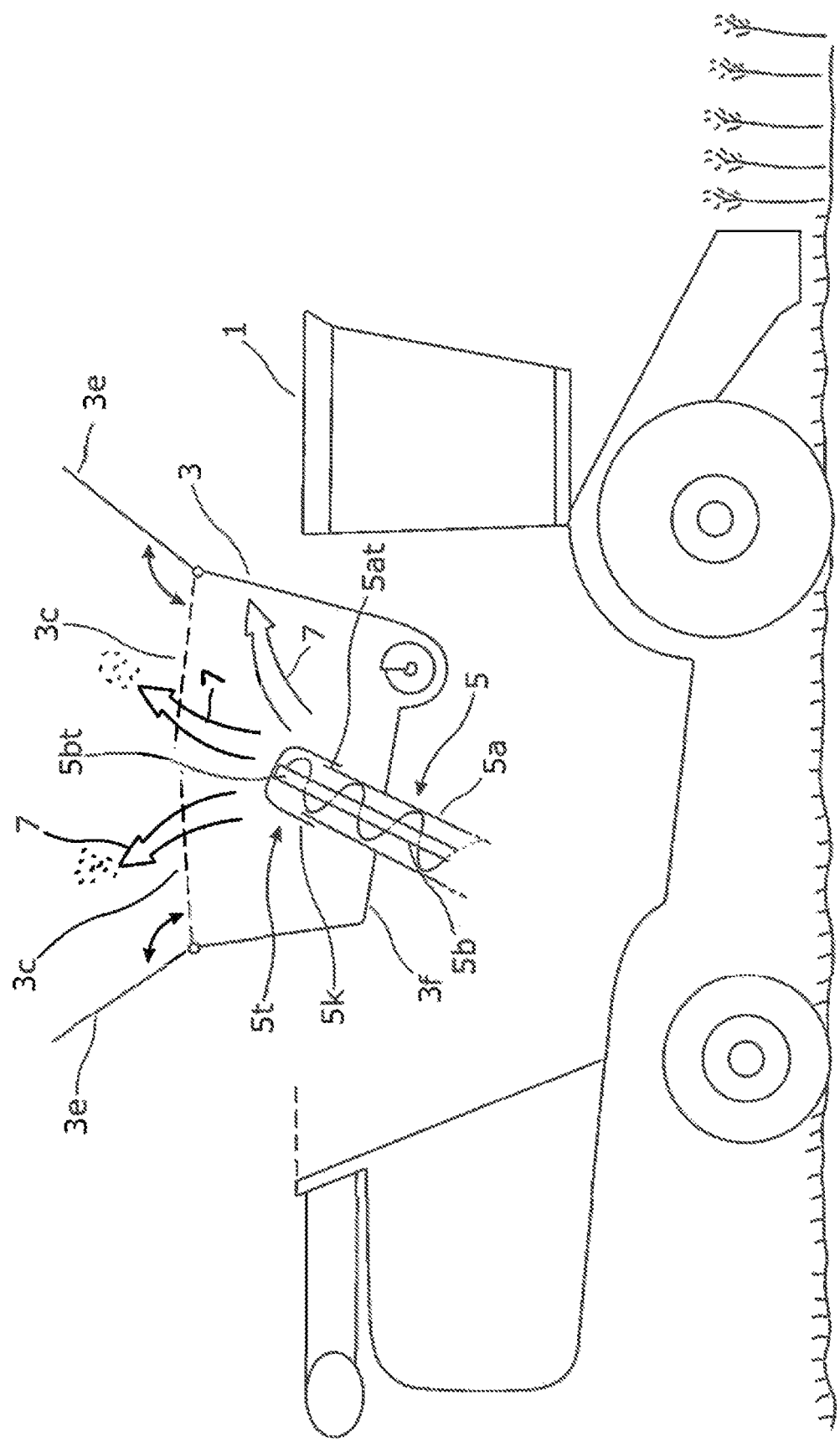
FIG. 1 is a simplified side view of a combine harvester having a grain bin with an auger conveyor.
Figure 2A:
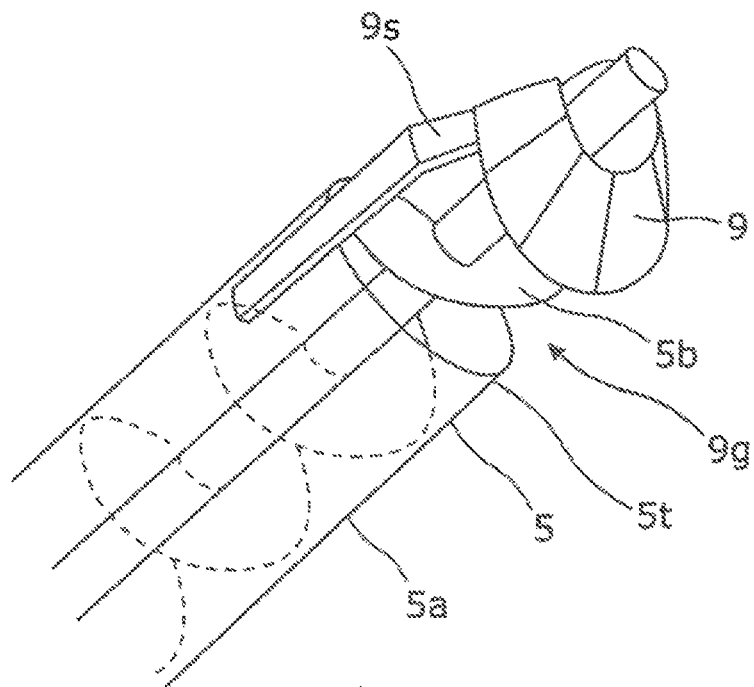
FIG. 2A is a simplified perspective view of a conventional fixed auger cover.
Figure 2B:
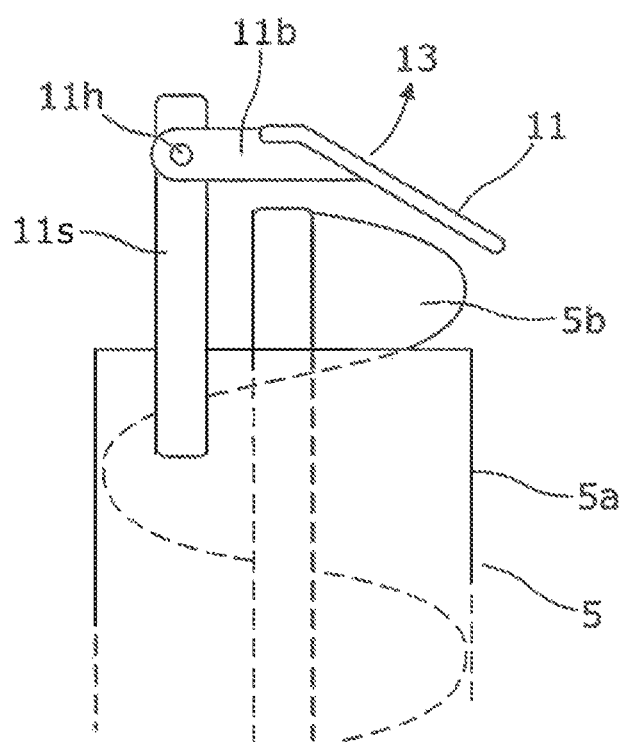
FIG. 2B is a simplified side view of a conventional hinged auger cover.
Figure 5:
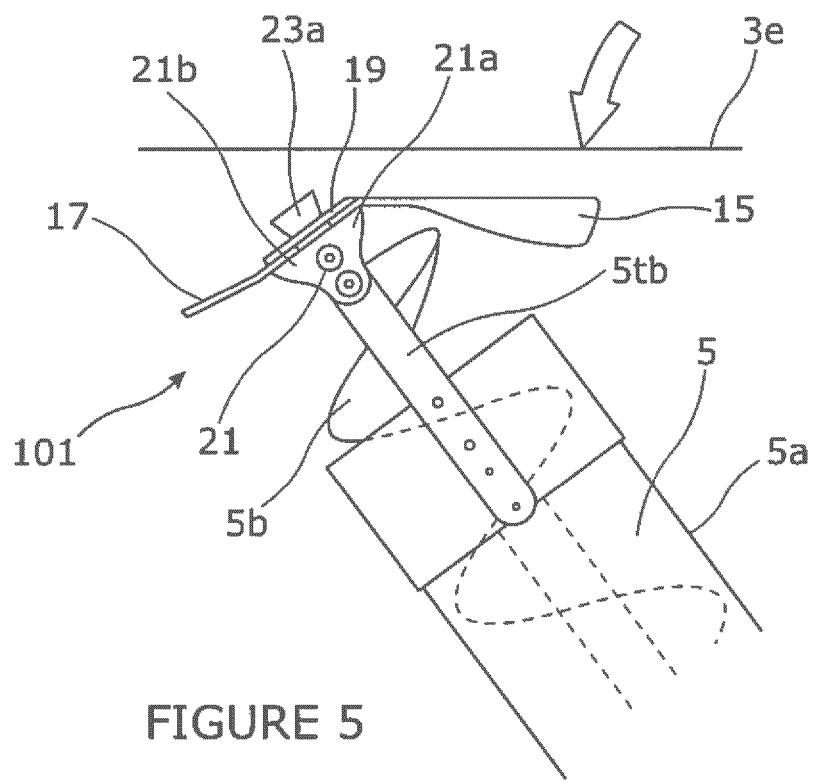
FIG. 5 shows a side view of the auger of FIG. 4 and the auger cover of FIGS. 3 and 4 assembled in a covered grain bin.

FIG. 5 shows a side view of the auger 5 and auger cover assembly 101 assembled together. Also shown is the proximity of the auger cover assembly to a closed cover 3e of the grain bin 3 (depicted in FIG. 1), which close proximity is desirable as has been previously discussed. The cover plates 15 and 17 are resting on the lower hardstops 21a and 21b, respectively, of the brackets 21. The grain bin 3 is empty in FIG. 5.

Figure 6:
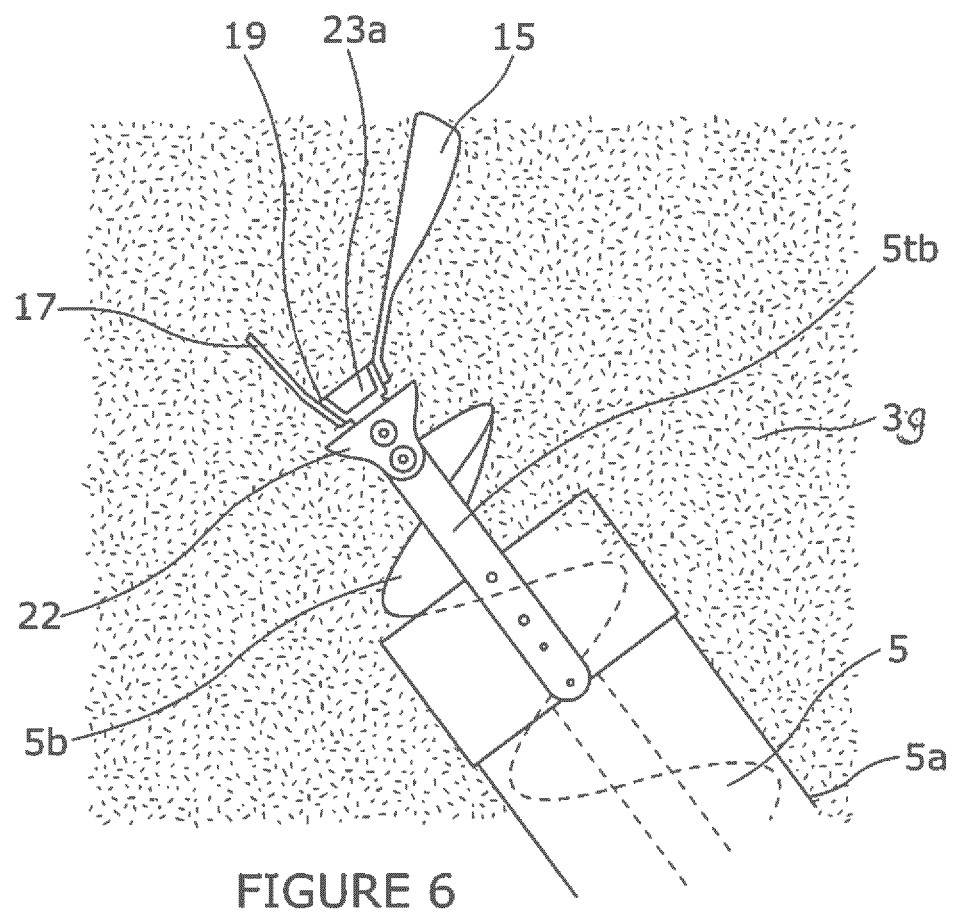
FIG. 6 shows a side view of the auger, auger cover, and grain bin shown in FIG. 5 after the grain bin has been filled with enough grain to cover the auger and the auger cover.

FIG. 6 shows a side view of the auger 5 and auger cover assembly 101 assembled together when the grain bin 3 is full of grain 3g. The rising level of grain 3g in the bin as the grain has entered the bin has caused the cover plates 15 and 17 to rise up until they contact the upper hardstops 23a of the upper hardstop brackets 23.

The upward movement of the cover plates 15 and 17 has been allowed by the flexible nature of the canvas hinge plates 19, which nonetheless also have a degree of resilience that prevents the cover plates from being pushed straight up into the upper hardstops 23a by the action of grain coming into the grain bin 3 via the auger 5. Due to the resilience of the hinge plates 19, when the grain bin 3 is subsequently emptied, the cover plates 15 and 17 return to their original positions as shown in FIG. 5.

The canvas hinge plates may be a cotton canvas covered with a vulcanized rubber coating as previously disclosed. The lay up' of the cotton canvas may be selected such that the threads of the canvas are aligned to ensure that the plate is less resistant to flexing in one direction than another; consequently the hinges are carefully built into the auger cover assembly such that, in this embodiment, the hinge is less resistant to flexing in an upwards direction. Also, the lay up' of the cotton canvas may be selected such that the hinge will have maximum resistance to any sideways flexion of the hinge, consequently minimizing any undesirable sideways motion of the cover plates.

Additional non-limiting example embodiments of the disclosure are described below.

Embodiment 1: An auger cover for an auger conveyor for a grain bin of a combine harvester, the auger cover comprising a cover plate, the cover plate being hingedly attached to the auger conveyor. The hinge comprises a hinge plate of flexible material.

Embodiment 2: The auger cover of Embodiment 1, wherein the flexible material comprises a resiliently flexible material.

Embodiment 3: The auger cover of Embodiment 1, wherein the flexible material comprises a canvas material.

Embodiment 4: The auger cover of Embodiment 1, wherein the flexible material comprises a rubberized canvas material.

Embodiment 5: The auger cover of Embodiment 1, wherein the flexible material comprises a cotton canvas material with a vulcanized rubber coating.

Embodiment 6: The auger cover of Embodiment 1, wherein the flexible material comprises a canvas material laid up to provide greater flexibility in a specific direction.

Embodiment 7: The auger cover of Embodiment 1, wherein the flexible material is in the range from 4 mm to 10 mm thick.

Embodiment 8: The auger cover of Embodiment 1, wherein the flexible material is in the range from 6 mm to 8 mm thick.

Embodiment 9: The auger cover of Embodiment 1, wherein the flexible material is approximately 7 mm thick.

Embodiment 10: The auger cover of Embodiment 1, wherein the cover plate comprises a pair of cover plates.

Embodiment 11: The auger cover of Embodiment 10, wherein the pair of cover plates shares a common hinge plate.

Embodiment 12: The auger cover of Embodiment 10 or Embodiment 11, wherein the pair of cover plates shares a pair of common hinge plates.

Embodiment 13: A cover plate for an auger cover for an auger conveyor, the cover plate comprising a hinge by which the cover plate is attached to the auger conveyor, the hinge comprising a resiliently flexible plate.

Embodiment 14: The cover plate of Embodiment 13, wherein the hinge comprises a canvas material.

Embodiment 15: The cover plate of Embodiment 13, wherein the hinge comprises a cotton canvas material with a vulcanized rubber coating.

Embodiment 16: A combine harvester comprising an auger cover as described in any of Embodiments 1 through 12 or a cover plate as described in any of Embodiments 13 through 15.

Clearly the skilled person will recognize that various aspects, embodiments and elements of the present disclosure, including as illustrated in the figures or described in the example embodiments above, may be arranged in differing combinations, any and all of which may be considered to fall within the scope of the invention as contemplated by the inventors. The invention will be defined by the following claims.

The invention claimed is:

1. An auger cover for an auger conveyor for filling a grain bin of a combine harvester, the auger cover comprising:
   at least one cover plate;
   a hinge connected to the at least one cover plate and configured to hingedly attach the at least one cover plate to an auger conveyor;
   wherein the hinge comprises at least one hinge plate comprising a flexible material;
   wherein the at least one cover plate can move between a first position and a second position;
   wherein the at least one hinge plate urges the at least one cover plate toward the first position; and
   wherein the at least one cover plate is spaced apart from the auger conveyor and arranged to be disposed in the path of grain ejected from the auger conveyor when the at least one cover plate is in the first position.

2. The auger cover of claim 1, wherein the flexible material comprises a resiliently flexible material.

3. The auger cover of claim 1, wherein the flexible material comprises a canvas material.

4. The auger cover of claim 3, wherein the flexible material comprises a rubberized canvas material.

5. The auger cover of claim 4, wherein the flexible material comprises a cotton canvas material with a vulcanized rubber coating.

6. The auger cover of claim 3, wherein the flexible material comprises a canvas material exhibiting a first flexibility in a first direction and a second flexibility in a second direction, the second flexibility different than the first flexibility.

7. The auger cover of claim 1, wherein the flexible material exhibits a thickness from 4 mm to 10 mm.

8. The auger cover of claim 7, wherein the flexible material exhibits a thickness from 6 mm to 8 mm.

9. The auger cover of claim 8, wherein the flexible material is approximately 7 mm thick.

10. The auger cover of claim 1, wherein the at least one cover plate comprises a pair of cover plates.

11. The auger cover of claim 10, wherein the pair of cover plates shares a common hinge plate.

12. The auger cover of claim 10, wherein the pair of cover plates shares a pair of common hinge plates.

13. The auger cover of claim 1, further comprising at least one upper hardstop bracket configured to limit movement of the hinge plate away from the auger conveyor.

14. The auger cover of claim 1, further comprising at least one lower hardstop bracket configured to limit movement of the hinge plate toward the auger conveyor.

15. An auger conveyor for a grain bin of a combine harvester, the auger conveyor comprising:
    an auger tube;
    an auger screw within the auger tube and configured to rotate relative to the auger tube;
    an auger cover comprising:
       at least one cover plate;
       a hinge connecting the at least one cover plate to the auger tube;
       wherein the hinge comprises at least one hinge plate comprising a flexible material, wherein the at least one cover plate can move between a first position and a second position;
       wherein the at least one hinge plate urges the at least one cover plate toward the first position; and
       wherein the at least one cover plate is spaced apart from the auger conveyor and disposed in the path of grain ejected from the auger conveyor when the at least one cover plate is in the first position.

16. The auger conveyor of claim 15, wherein the hinge is attached to the auger tube via an auger top bracket.

17. A combine harvester, comprising:
    a grain bin;
    an auger tube at least partially within the grain bin;
    an auger screw within the auger tube and configured to rotate relative to the auger tube;
    an auger cover within the grain bin, the auger cover comprising:
       at least one cover plate disposed in the path of grain ejected from the auger tube;
       a hinge connecting the at least one cover plate to the auger tube, wherein the hinge comprises at least one hinge plate comprising a flexible material.

18. The combine harvester of claim 17, wherein the hinge is attached to the auger tube via an auger top bracket.

19. The combine harvester of claim 17, further comprising at least one grain bin extension configured to move from an open position to a closed position.

20. The combine harvester of claim 19, wherein the auger cover is located above a floor of the grain bin and below the grain bin extension when the grain bin extension is in the closed position.

* * * * *